United States Patent [19]

Urakami et al.

[11] Patent Number: 4,957,994
[45] Date of Patent: Sep. 18, 1990

[54] EPOXY RESINS CONTAINING IMIDO RINGS, PRODUCTION PROCESS THEREOF AND EPOXY RESIN COMPOSITIONS CONTAINING THE SAME

[75] Inventors: Tatsuhiro Urakami; Yoshimitsu Tanabe, both of Yokohama; Keizaburo Yamaguchi, Chiba; Akihiro Yamaguchi, Kamakura, all of Japan

[73] Assignee: Mitsui Toatsu Chemicals, Inc., Tokyo, Japan

[21] Appl. No.: 393,798

[22] Filed: Aug. 15, 1989

[30] Foreign Application Priority Data

Aug. 19, 1988 [JP] Japan .................. 63-204789

[51] Int. Cl.$^5$ ............................ C08G 59/26
[52] U.S. Cl. ................... 528/90; 548/520; 525/481; 525/510
[58] Field of Search ............ 528/90; 548/520; 525/481, 510

[56] References Cited

U.S. PATENT DOCUMENTS

| | | | |
|---|---|---|---|
| 3,450,711 | 6/1969 | Megna et al. | 528/96 X |
| 4,296,219 | 10/1981 | Takahashi et al. | 548/520 X |
| 4,340,715 | 2/1982 | Gounder et al. | 528/96 X |
| 4,632,972 | 12/1986 | Hefner et al. | 528/96 |
| 4,636,542 | 1/1987 | Mefner et al. | 528/96 X |
| 4,888,407 | 12/1989 | Yasuhisa et al. | 528/96 X |

Primary Examiner—Earl Nielsen
Attorney, Agent, or Firm—Burns, Doane, Swecker & Mathis

[57] ABSTRACT

An opoxy resin is obtained by reacting an epihalohydrin with an imido-ring-containing diphenol represented by the following formula (I):

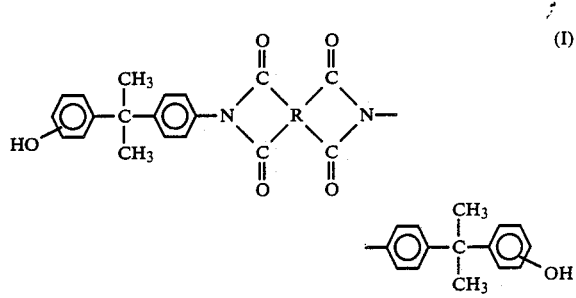

wherein R represents an aliphatic group having at least two carbon atoms, an alicyclic group, a monocyclic aryl group, a fused polycyclic aromatic group, or a non-fused polycyclic aromatic group formed of aromatic groups coupled together directly or via a linking member and the two hydroxyl groups are each bonded to a meta position or the para position. In the epoxy resin, at least 50% of the hdroxyl groups of molecules of the diphenol have been opoxidized.

15 Claims, 4 Drawing Sheets

EPOXY RESINS CONTAINING IMIDO RINGS, PRODUCTION PROCESS THEREOF AND EPOXY RESIN COMPOSITIONS CONTAINING THE SAME

BACKGROUND OF THE INVENTION

(1) Field of the Invention

This invention relates to novel and useful epoxy resin compositions having good adhesion properties, heat resistance and mechanical properties in combination. This invention is also concerned with novel epoxy resins obtained by reacting an epihalohydrin with an imido-ring-containing diphenol as an epoxy resin component and further with a process for the production thereof.

(2) Description of the Prior Art

Epoxy resins have been used widely as high-performance resins in a wide variety of products such as adhesives, paints, sealants and patching materials for their excellent mechanical and electrical properties and adhesion properties. Epoxy resins usable for these applications typically include 2,2-bis(4-hydroxyphenyl)propane, phenol novolak resin, o-cresol novolak resins, and those composed basically of polyfunctional epoxy resins derived from 4,4'-methylenedianiline, 4,4'-diaminodiphenyl sulfone or the like and an epihalohydrin. These epoxy resins have responded successfully to various performance demands in each field of application. They are also used in combination with a known curing agent and if necessary, with a curing accelerator, a filler and the like in the various application fields.

In recent years, the application of epoxy resins has however spread to advanced fields of technology such as high-performance composite materials and electronic materials in the space and aircraft industry and the like. Reflecting this, extremely high performance is required for matrix resins and adhesives in such advanced fields of technology. It is thus the present situation that the conventional epoxy resins can hardly satisfy such various performance demands.

In particular, there is almost no known epoxy resin composition which can satisfy all the performance demands required with respect to heat resistance, adhesion properties, mechanical strength, etc.

SUMMARY OF THE INVENTION

This invention has been completed to overcome the above problems and drawbacks of the prior art technology.

An object of this invention is therefore to provide epoxy resins capable of meeting high levels of performance required in advanced fields of technology, namely, having well-balanced high performance with respect to heat resistance, adhesion properties, mechanical strength and the like.

Another object of this invention is to provide a process for the production of such resins.

A further object of this invention is to provide epoxy resin compositions formed principally of such epoxy resins.

To achieve the above objects, the present invention provides an epoxy resin obtained from an imido-ring-containing diphenol represented by the following formula (I):

wherein R represents an aliphatic group having at least two carbon atoms, an alicyclic group, a monocyclic aryl group, a fused polycyclic aromatic group, or a non-fused polycyclic aromatic group formed of aromatic groups coupled together directly or via a linking member and the two hydroxyl groups are each bonded to a meta position or the para position, at least 50% of the hydroxyl groups of molecules of said diphenol having been epoxidized; a process for producing the epoxy resin by reacting the imido-ring-containing diphenol with an epihalohydrin; and a resin composition comprising the epoxy resin and a curing agent and if necessary a curing accelerator.

Significant improvements in heat resistance can be observed in cured articles obtained from the resin composition of this invention because of the use of the epoxy resin containing imido rings which do not take part in the curing reaction. Further, the epoxy resin has a 2,2'-bis(hydroxyphenyl)propane type skeleton and cures depending on epoxy groups bonded thereto. Therefore, the cured articles can also show excellent performance in mechanical strength and adhesion properties.

DETAILED DESCRIPTION OF THE INVENTION

A production process of the epoxy resin according to this invention will be described.

First, a tetracarboxylic dianhydride represented by the following formula (a):

wherein R has the same meaning as defined in the formula (I) is reacted with a stoichiometric amount or a small excess of 2-(3-hydroxyphenyl)-2-(4-aminophenyl)propane or 2-(4-hydroxyphenyl)-2-(4-aminophenyl)propane in a polar solvent inert to the reaction, thereby forming an amide-acid-containing diphenol represented by the following formula (b):

(b)

wherein R has the same meaning as defined in the formula (I) and the two hydroxyl groups are each bonded to a meta position or the para position. The amide-acid-containing diphenol is then heated to a suitable temperature, so that it undergoes a dehydration reaction to provide the imido-ring-containing diphenol represented by the formula (I).

Usable tetracarboxylic dianhydrides includes, for example, ethylenetetracarboxylic dianhydride, 1,2,3,4-butanetetracarboxylic dianhydride, cyclopentanetetracarboxylic dianhydride, pyromellitic dianhydride, 3,3′,4,4′-benzophenonetetracarboxylic dianhdride, 2,2′,3,3′-benzophenonetetracarboxylic dianhydride, 3,3′,4,4′-biphenyltetracarboxylic dianhydride, 2,2′,3,3′-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,910-perillenetetracarboxylic dianhydride, 2,3,6,7-anthracenetetracarboxylic dianhydride, 1,2,7,8-anthracenetetracarboxylic dianhydride, 1,2,7,8-phenanethrenetetracarboxylic dianhydride, 1,3-bis(3,4-dicarboxyphenoxy)phenyl dianhydride, etc.

As the reaction solvent, an organic polar solvent inert to the reaction, such as N,N-dimethylacetamide, N,N-dimethylformamide, N-methyl-2-pyrrolidone, 1,3-dimethyl-2-imidazolidinone, N,N-diethylacetamide, phenol, cresol, hexamethylphosphor amide, tetramethylurea, dimethylsulfoxide, dimethylsulfone, sulfolane, dimethylsulfolane or the like, can be used either singly or in combination with one or more other solvents. It can also be used in combination with a solvent such as benzene, toluene, xylene or cyclohexane.

The reaction temperature may be about 50° C. or lower, preferably about 40° C. or lower, more preferably from about 20° C. to about 25° C. in the first stage, namely, upon formation of the amide-acid-containing diphenol. The reaction is allowed to proceed at the same temperature until the formation of the amide-acid-containing diphenol is fully completed. The reaction time generally ranges from about 0.5 hour to about 15 hours.

In the second-stage reaction in which the amide-acid-containing diphenol obtained by the preceding reaction is subjected to dehydration and cyclization under heat to form an imido-ring-containing diphenol, the reaction temperature generally ranges from about 100° C. to about 300° C., preferably from about 130° C. to about 250° C. The reaction is allowed to proceed at the same temperature until the formation of the imido-ring-containing diphenol is completed. It is generally sufficient when the reaction is conducted for about 1-15 hours.

The imido-ring-containing diphenol formed by the above procedures can be obtained as crystals, for example, by cooling the reaction mixture or pouring the reaction mixture into a solvent such as water or methanol.

The imido-ring-containing diphenol thus obtained can be epoxidized by a method known per se in the art.

Namely, the imido-ring-containing diphenol and an epihalohydrin, suitably epichlorohydrin are reacted in a temperature range of from about 40° C. to about 120° C., preferably from about 80° C. to about 120° C. in the presence or absence of a hydrogen halide acceptor, whereby the desired imido-ring-containing epoxy resin can be obtained. The epoxidized product can be obtained by simply heating a mixture of the imido-ring-containing diphenol and the epihalohydrin within the above temperature range. In the above reaction, the epihalohydrin can be used in at least an equimolar amount, preferably in a molar amount as much as about 3 to about 100 times, more preferably about 10 to about 50 times based on active hydrogen.

Further, from the standpoint of uniformity, smoothness and the like of the reaction, it is also possible to conduct the reaction in an organic solvent if necessary. As the solvent usable in the reaction, may be mentioned sulfolane, dimethylsulfolane, N-methyl-pyrrolidone, 1,3-dimethyl-2-imidazolidinone, hexamethylphosphor amide, etc.

Although no particular limitation is imposed on the amount of the solvent, the solvent is generally used in an amount as much as 0–50 times by weight, preferably 0–20 times by weight the diphenol compound, 0 times standing for a situation where no solvent is used. It is preferable to use the solvent in an amount sufficient to convert the reaction mixture into a fully uniform solution.

Preferred examples of the hydrogen halide acceptor employed in this invention include metal hydroxides such as lithium hydroxide, sodium hydroxide, potassium hydroxide, magnesium hydroxide and calcium hydroxide; alkali metal salts of organic acids, such as sodium formate and sodium acetate; organic amines such as trimethylamine and triethylamine; and alcoholates such as sodium methoxide, potassium methoxide, sodium ethoxide and potassium ethoxide. Of these, alkali metal hydroxides such as potassium hydroxide and sodium hydroxide are preferred.

They can each be added either as an aqueous solution or as a solid. When added as an aqueous solution, the solution may be of any desired concentration. It is however desirable to choose a concentration of 40% or higher from the standpoint of efficiency.

By gradually adding the hydrogen halide acceptor at the above reaction temperature to the mixture of the imido-ring-containing diphenol and epihalohydrin, a glycidyl ether is formed via a halohydrin ether formed by the addition of the epihalohydrin. By produced water accumulates in the system in the course of the reaction. When the epihalohydrin is azeotropically distilled out together with water, water is separated by a water trap and is taken out of the system while the epihalohydrin is returned to the system, so that the concentration of the reaction mixture is maintained constant.

After completion of the reaction, the resultant epoxy resin can be obtained by filtration when the target product is obtained in the form of a solid. When it is obtained in the form of a solution, the imido-ring-containing epoxy resin can be obtained as a solid by distilling out any excess epihalohydrin or the organic solvent or by using a precipitating solvent or by using these methods in combination.

As the precipitating solvent, it is possible to use methanol, ethanol, isopropanol, acetone, benzene, toluene, xylene, hexane or the like.

In the epoxy resin obtained by the above procedures, it is desirable that at least 50% of the hydroxyl groups of molecules of the imido-ring-containing diphenol have been epoxidized.

The epoxy resin composition according to this invention will next be described.

The resin composition of this invention is obtained by using as an essential epoxy component the epoxy resin obtained by the above procedures and adding a curing agent and optionally a curing accelerator to the epoxy resin.

Needless to say, one or more epoxy resins of different types can also be used in combination. Typical examples of resins of such types include novolak resins obtained by condensation of monohydric phenol such as phenol or an aralkylphenol and formaldehyde or the like; polyfunctional epoxy resins obtained by reacting a hydroxyl component, e.g., a bisphenol such as 2,2-bis(4-hydroxyphenyl)propane, bis(4-hydroxyphenyl)methane or bis(4-hydroxyphenyl)sulfone with an epihalohydrin; polyfunctional epoxy resins obtained by reacting an epihalohydrin with an amine component such as methaphenylenediamine, diaminotoluene, 4,4'-methylenedianiline, 3,3'-diaminodiphenylsulfone, 4,4'-diaminodiphenylsulfone or the like; epoxy resins derived from amino phenols, phthalic acids, hydantoins or the like; and other commonly known and used epoxy resins.

When an epoxy resin of this invention is used in combination with one of the above epoxy resins known and used commonly, they must be used at a weight ratio in a range of from 100/0 to 20/80, 0 standing for a situation where none of the commonly known and used epoxy resin is used, in order to allow the resultant composition of this invention to show excellent performance in adhesion properties, heat resistance and mechanical strength. Preferably, the proportion of the former resin should be at least 30 wt. %.

An epoxy resin composition of this invention can also be formed especially by using an epoxy resin of this invention as an epoxy component in a proportion of at least 15 wt. % of the whole components of the epoxy resin composition and if necessary, by also employing one or more of the various other epoxy resins known and used commonly.

As a curing agent constituting the composition, any of compounds commonly used as curing agents for epoxy resins can be used in this invention. Among such compounds, representative examples include those disclosed in various publications led by H. Lee et al., "Handbook of the Epoxy Resin". As particularly preferred curing agents, may be mentioned novolak resins, alicyclic amines, aromatic amines, aromatic amine-formaldehyde condensation products, guanidine derivatives, dicyandiamide and polybasic acid anhydrides.

When one of the above listed compounds is used as a curing agent, it is also necessary to use a curing accelerator in combination in many instances. In such cases, it is possible to use any one of commonly known and used curing accelerators led by compounds described in publications such as that referred to above, e.g., tertiary amines such as dimethylbenzylamine, imidazoles and various metal compounds.

The composition of this invention may also be added, if necessary, with one or more of various additives known and used commonly, such as fillers, colorants, flame retardants, releasing agents and coupling agents.

Curable resin compositions of this invention, which are obtained in a manner as described above, exhibit superb performance in adhesion properties, heat resistance and mechanical strength and are extremely useful not only as molding materials and casting materials but also as matrix resins for composite materials and adhesives.

The present invention will hereinafter be described more specifically by the following examples and comparative examples.

SYNTHESIS EXAMPLE 1

A reactor fitted with a stirrer, a reflux condenser, a thermometer and a nitrogen gas inlet tube was charged with 250 ml of N,N-dimethylacetamide which had been subjected to a water removal treatment, 47.7 g (0.21 mole) of 2-(4-hydroxyphenyl)-2-(4'-aminophenyl)propane and 33.8 g (0.105 mole) of 3,3',4,4'-benzophenonetetracarboxylic dianhydride.

They were then stirred at room temperature for 15 hours. The reaction mixture was thereafter heated to 150°–170° C., at which it was stirred for about 5 hours.

After completion of the reaction, the reaction mixture was cooled to room temperature, and 250 ml of methanol were added, followed by stirring. An imido-ring-containing diphenol of a pale yellow color was formed as crystals. The pale yellow crystals were collected by filtration and then washed with a mixed solvent of N,N-dimethylacetamide and methanol. They were washed further with 50 ml of methanol and then dried to obtain 63.7 g of pale yellow powder.

Its purity was found to be 99.0% by high-performance liquid chromatography.

Other analytical results are as follows:

Melting point: 250°–256° C.

Melting point: 250–256° C.
Elemental analysis: $C_{47}H_{36}N_2O_7$

|  | C | H | N |
|---|---|---|---|
| Calculated: | 76.22 | 4.86 | 3.78 |
| Found: | 75.83 | 4.53 | 3.76 |

MS (FD): $741^{(M+1)}$
IR (KBr): $1600\ cm^{-1}\ (=CO)$
$1720, 1770\ cm^{-1}\ (=CO\ \text{of imido rings})$
$3480\ cm^{-1}\ (-OH)$ 51.8 g (0.07 mole) of the imido-ring-containing diphenol obtained above were placed in a reactor fitted with a stirrer, a thermometer, a Dean-Stark's water trap and a reflux condenser and were then mixed with 350 g (3.8 moles) of epichlorohydrin. They were stirred at 110°–115° C. until the former was completely dissolved.

Next, 16.8 g of a 40% aqueous solution of sodium hydroxide were added dropwise over 3 hours while maintaining the temperature at 110°–115° C. Of water and epichlorohydrin distilled out azeotropically, the water was taken out of the system while the epichlorohydrin was returned to the system.

After completion of the dropwise addition, the contents were continuously stirred for an additional 15 hours while maintaining the temperature at the same level. After completion of the reaction, the resultant inorganic salt was removed at room temperature by suction filtration. The reaction mixture was then concentrated to a total volume of about 120 ml. The concentrate was added dropwise over 2 hours into 1500 ml of isopropyl alcohol which was being stirred vigorously, so that an imido-ring-containing epoxy resin was caused to precipitate as yellow powder.

The yellow powder was collected by filtration, washed with 200 ml of isopropyl alcohol and then dried, thereby obtaining 56.3 g of the intended imido-ring-containing epoxy resin as yellow powder.

The epoxy equivalent of the epoxy resin was 482.5 g/eq, and its softening point was 118°–128° C.

Figure 1:
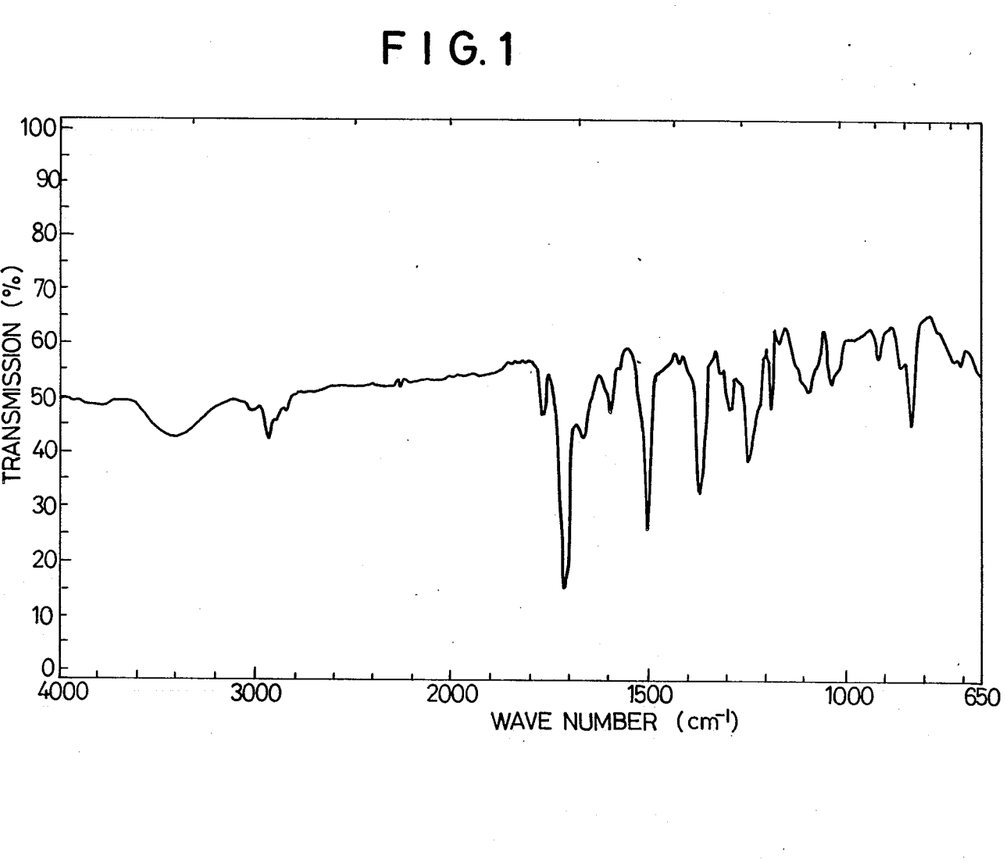
FIG. 1 is an IR spectrum diagram of the epoxy resin obtained in Synthesis Example 1.

The results of its IR analysis are shown in FIG. 1.

SYNTHESIS EXAMPLE 2

A reactor fitted with a stirrer, a reflux condenser, a thermometer and a nitrogen gas inlet tube was charged with 250 ml of N,N-dimethylacetamide which had been subjected to a water removal treatment, 47.7 g (0.21 mole) of 2-(4-hydroxyphenyl)-2-(4'-aminophenyl)propane and 22.9 g (0.105 mole) of pyromellitic dianhydride.

They were then stirred at room temperature for 15 hours. The reaction mixture was thereafter heated to 150°–170° C., at which it was stirred for about 5 hours.

After completion of the reaction, the reaction mixture was cooled so that an imido-ring-containing diphenol was allowed to precipitate as yellow crystals. The yellow crystals were collected by filtration, and then washed twice with a mixed solvent of 20 ml of N,N-dimethylacetamide and 50 ml of methanol, respectively. They were then dried to obtain 61.0 g of yellow powder.

Analytical results are as follows:
Melting point: at least 300° C.

| Melting point: at least 300° C. | | | |
|---|---|---|---|
| Elemental analysis: $C_{40}H_{32}N_2O_6$ | | | |
|  | C | H | N |
| Calculated: | 75.50 | 5.03 | 4.40 |
| Found: | 75.20 | 4.86 | 4.49 |
| MS (FD): | $636^{(M+1)}$ | | |
| IR (KBr): | 1700, 1765 $cm^{-1}$ (= CO of imido rings) | | |
|  | 3400 $cm^{-1}$ (—OH) | | |

44.5 g (0.07 mole) of the imido-ring-containing diphenol obtained above were placed in a reactor fitted with a stirrer, a thermometer, a Dean-Stark's water trap and a reflux condenser and were then mixed with 64.8 g (0.7 mole) of epichlorohydrin and 400 ml of sulfolane. They were stirred at 110°–115° C. until the diphenol was completely dissolved.

Next, 16.8 g of a 40% aqueous solution of sodium hydroxide were added dropwise over 3 hours while maintaining the temperature at 110°–115° C.

After completion of the dropwise addition, the contents were continuously stirred for an additional 30 hours while maintaining the temperature at the same level. After completion of the reaction, the reaction mixture was cooled to room temperature and poured into 200 ml of methanol. The resulting yellow powder was collected by filtration and thereafter washed with 80 ml of methanol.

The yellow powder was vigorously stirred in 200 ml of water. After removal of the resultant inorganic salt, they were washed twice with 100 ml portions of water and once with 100 ml of methanol and then dried to obtain 51.3 g of the intended imido-ring-containing epoxy resin as yellow powder.

The epoxy equivalent of the epoxy resin was 441.5 g/eq, and its softening point was 162°–171° C.

SYNTHESIS EXAMPLE 3

Using 32.6 g (0.105 mole) of 3,3',4,4'-diphenylether-tetracarboxylic dianhydride in place of 3,3',4,4'-benzophenonetetracarboxylic dianhydride in the reaction of Synthesis Example 1, 52.8 g of the corresponding imido-ring-containing epoxy resin were obtained.

The epoxy equivalent of the epoxy resin was 475 g/eq, and its softening point was 98°–105° C.

SYNTHESIS EXAMPLE 4

A reactor fitted with a stirrer, a reflux condenser, a thermometer and a nitrogen gas inlet tube was charged with 250 ml of N,N-dimethylacetamide which had been subjected to a water removal treatment, 47.7 g (0.21 mole) of 2-(3-hydroxyphenyl)-2-(4'-aminophenyl)propane and 33.8 g (0.105 mole) of 3,3',4,4'-benzophenonetetracarboxylic dianhydride.

They were then stirred at room temperature for 5 hours. The reaction mixture was thereafter heated to 150°–170° C., at which it was stirred for about 15 hours.

After completion of the reaction, the reaction mixture was cooled to room temperature, and 250 ml of methanol were added, followed by stirring. An imido-ring-containing diphenol of a pale yellow color was formed as crystals. The pale yellow crystals were collected by filtration and then washed with a mixed solvent of N,N-dimethylacetamide and methanol. They were washed further with 50 ml of methanol and then dried to obtain 64.7 g of pale yellow powder.

Its purity was found to be 99.7% by high-performance liquid chromatography.

Other analytical results are as follows:
Melting point: 188°–191° C.

| Melting point: 188–191° C. | | | |
|---|---|---|---|
| Elemental analysis: $C_{47}H_{36}N_2O_7$ | | | |
|  | C | H | N |
| Calculated: | 76.22 | 4.86 | 3.78 |
| Found: | 75.92 | 5.00 | 3.97 |
| MS (FD): | $741^{(M+1)}$ | | |
| IR (KBr): | 1660 $cm^{-1}$ (= CO) | | |
|  | 1720, 1770 $cm^{-1}$ (= CO of imido rings) | | |
|  | 3480 $cm^{-1}$ (—OH) | | |

51.8 g (0.07 mole) of the imido-ring-containing diphenol obtained above were placed in a reactor fitted with a stirrer, a thermometer and a reflux condenser and were then mixed with 485 g (5.25 moles) of epichlorohydrin. They were continuously stirred at 95°–105° C. for 5 hours in a completely dissolved state, thereby bringing the reaction to completion.

The reaction mixture thus obtained was cooled to 70° C. At temperatures of 70° C. and lower, 460 g of excess epichlorohydrin were recovered by distillation under reduced pressures. The concentrate was added with 150 g of isopropyl alcohol. When the resulting mixture was stirred for 15 minutes at temperatures not higher than 60° C., the mixture separated into an oil layer and an alcohol layer. Upon pouring the oil layer into 225 g of isopropyl alcohol which was being stirred vigorously, 55.7 g of an imido-ring-containing epoxy resin were obtained as yellow powder.

The epoxy equivalent of the epoxy resin was 479.5 g/eq, and its softening point was 95°-105° C.

Figure 2:
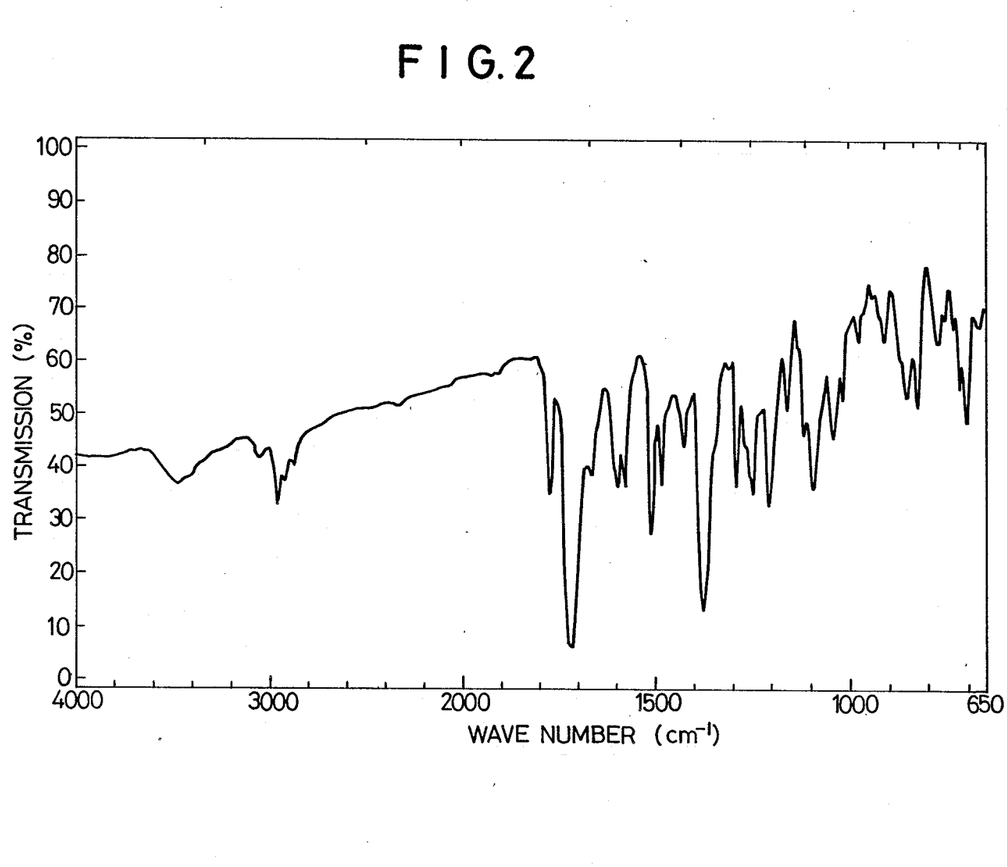
FIG. 2 is an IR spectrum diagram of the epoxy resin obtained in Synthesis Example 4.

The results of its IR analysis are shown in FIG. 2.

SYNTHESIS EXAMPLE 5

A reactor fitted with a stirrer, a reflux condenser, a thermometer and a nitrogen gas inlet tube was charged with 250 ml of N,N-dimethylacetamide which had been subjected to a water removal treatment, 47.7 g (0.21 mole) of 2-(3-hydroxyphenyl)-2-(4'-aminophenyl)propane and 22.9 g (0.105 mole) of pyromellitic dianhydride.

They were then stirred at room temperature for 15 hours. The reaction mixture was thereafter heated to 150°-170° C., at which it was stirred for about 5 hours.

After completion of the reaction, the reaction mixture was cooled and then poured into 900 ml of water. An imido-ring-containing diphenol was formed as yellow crystals. The yellow crystals were collected by filtration and then washed twice with 20 ml of N,N-dimethylacetamide and 50 ml of methanol, respectively. They were then dried to obtain 61.2 g of yellow powder. Its purity was found to be 99.2% by high-performance liquid chromatography.

Analytical results are as follows:
Melting point: at least 300° C.

| Melting point: at least 300° C. | | | |
|---|---|---|---|
| Elemental analysis: $C_{40}H_{32}N_2O_6$ | | | |
|  | C | H | N |
| Calculated: | 75.50 | 5.03 | 4.40 |
| Found: | 75.10 | 4.79 | 4.20 |
| MS (FD): | $636^{(M+1)}$ | | |
| IR (KBr): | 1700, 1765 $cm^{-1}$ (= CO of imido rings) | | |
|  | 3400 $cm^{-1}$ (—OH) | | |

44.5 g (0.07 mole) of the imido-ring-containing diphenol obtained above were placed in a reactor fitted with a stirrer, a thermometer and a reflux condenser and were then mixed with 485 g (5.25 moles) of epichlorohydrin. They were continuously stirred at 95°-105° C. for 5 hours in a completely dissolved state, thereby bringing the reaction to completion.

The reaction mixture thus obtained was cooled to 70° C. At temperatures of 70° C. and lower, 300 g of excess epichlorohydrin were recovered by distillation under reduced pressures. Upon pouring the concentrate into 300 ml of methanol which was being stirred vigorously, an imido-ring-containing epoxy resin was obtained as yellow powder. The epoxy resin was collected by filtration, washed with 10 ml of methanol and then dried, thereby obtaining 51.5 g of an imido-ring-containing epoxy resin.

The epoxy equivalent of the epoxy resin was 443.5 g/eq, and its softening point was 156°-166° C.

Figure 3:
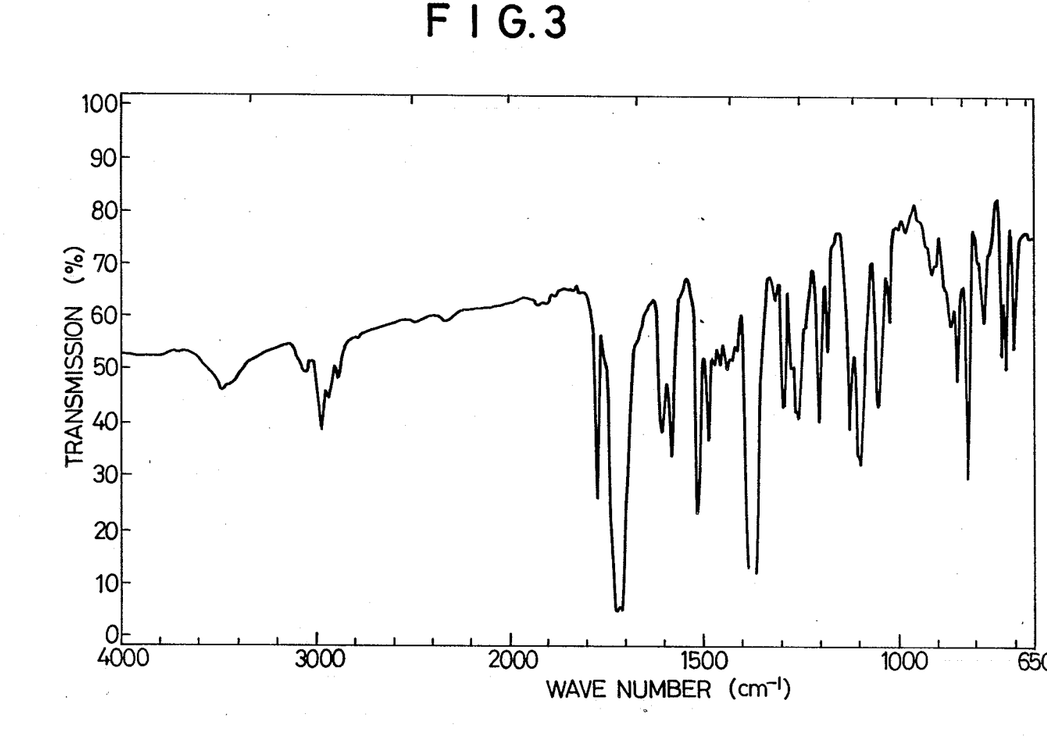
FIG. 3 is an IR spectrum diagram of the epoxy resin obtained in Synthesis Example 5.

The results of its IR analysis are shown in FIG. 3.

SYNTHESIS EXAMPLE 6

A reactor fitted with a stirrer, a reflux condenser, a thermometer and a nitrogen gas inlet tube was charged with 250 ml of N,N-dimethylacetamide which had been subjected to a water removal treatment, 47.7 g (0.21 mole) of 2-(3-hydroxyphenyl)-2-(4'-aminophenyl)propane and 32.6 g (0.105 mole) of bis(3,4-dicarboxyphenyl) ether anhydride.

They were then stirred at room temperature for 5 hours. The reaction mixture was thereafter heated to 150°-170° C., at which it was stirred for about 15 hours.

After completion of the reaction, the reaction mixture was cooled to room temperature, and 250 ml of methanol were added, followed by stirring. An imido-ring-containing diphenol of a pale yellow color was formed as crystals. The pale yellow crystals were collected by filtration and then washed with a mixed solvent of N,N-dimethylacetamide and methanol. They were washed further with 50 ml of methanol and then dried to obtain 64.7 g of pale yellow powder. Its purity was found to be 99.2% by high-performance liquid chromatography.

Analytical results are as follows:
Melting point: 166°-168° C.

| Melting point: 166–168° C. | | | |
|---|---|---|---|
| Elemental analysis: $C_{46}H_{36}N_2O_7$ | | | |
|  | C | H | N |
| Calculated: | 75.80 | 4.95 | 3.85 |
| Found: | 75.60 | 4.51 | 3.76 |
| MS (FD): | $729^{(M+1)}$ | | |
| IR (KBr): | 1240 $cm^{-1}$ (C—O—C) | | |
|  | 1720, 1770 $cm^{-1}$ (= CO of imido rings) | | |
|  | 3400 $cm^{-1}$ (—OH) | | |

51.8 g (0.07 mole) of the imido-ring-containing diphenol obtained above were placed in a reactor fitted with a stirrer, a thermometer and a reflux condenser and were then mixed with 485 g (5.25 moles) of epichlorohydrin. They were continuously stirred at 95°-105° C. for 5 hours in a completely dissolved state, thereby bringing the reaction to completion.

The reaction mixture thus obtained was cooled to 70° C. At temperatures of 70° C. and lower, 460 g of excess epichlorohydrin were recovered by distillation under reduced pressures. The concentrate was added with 150 g of isopropyl alcohol. When the resulting mixture was stirred for 15 minutes at temperatures not higher than 60° C., the mixture separated into an oil layer and an alcohol layer. Upon pouring the oil layer into 225 g of isopropyl alcohol which was being stirred vigorously, 55.7 g of an imido-ring-containing epoxy resin were obtained as yellow powder.

The epoxy equivalent of the epoxy resin was 475.5 g/eq, and its softening point was 80°-90° C.

Figure 4:
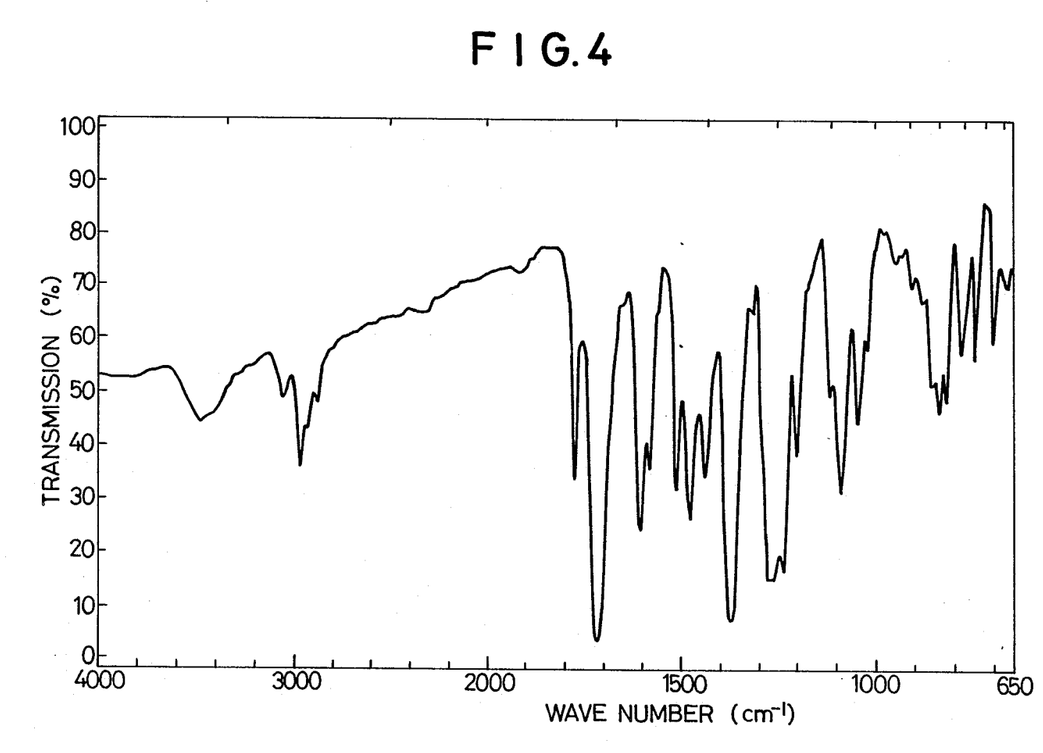
FIG. 4 is an IR spectrum diagram of the epoxy resin obtained in Synthesis Example 6.

The results of its IR analysis are shown in FIG. 4.

EXAMPLES 1-5 & COMPARATIVE EXAMPLE 1

Using 3,3'-DADPS (3,3'-diaminodiphenyl sulfone) as a curing agent, the invention epoxy resins shown in Table 1 were subjected to cast molding in accordance with the curing schedule given in Table 1. Thermal and mechanical properties of the resultant castings were measured.

The results are summarized in Table 1.

In addition, the results obtained from the use of a 2,2-bis(4-hydroxyphenyl)propane type epoxy resin ("EPICOAT 828", trade name; product of Shell Chemical Company, Ltd.) are also shown under Comparative Example 1.

EXAMPLES 6–11

Epoxides of the various imido-ring-containing diphenols obtained in Synthesis Examples 1–4 and if necessary other epoxy resins known and used commonly were mixed with one of curing agents and if necessary with a curing accelerator. The resultant mixtures were separately molten and kneaded at 120°–130° C. to obtain blends.

(A) The blends were separately heated at 150° C. for 2 hours and further at 200° C. for 2.5 hours, whereby the resins were cured. With respect to the individual resins thus cured, various properties were measured.

(B) A cold-rolled steel sheet (JIS G3141, SPCC/SD, 25×100×1.6 mm) which had been cleaned with trichloroethylene was coated with each blend. Another cold-rolled steel sheet of the same type was superposed on the coated side of the former steel sheet. The steel sheets were contact-bonded at 150° C. and then at 200° C., each for 1 hour under a pressure of 10 kg/cm².

The tensile shear adhesion strength of the thus-bonded steel sheets was measured at 20° C. and 150° C., respectively. The results are shown in Table 2.

The following curing agents were used.
(a) Phenol novolak resin ("BRG#5853", trade name; product of Showa High Polymer Co., Ltd.)
(b) Acid anhydride ("Epicure YH-306", trade name; product of Yuka Shell Epoxy Kabushiki Kaisha)
(c) 4,4'-Methylenedianiline

COMPARATIVE EXAMPLES 2–3

An epoxy resin ("EPICOAT 828", trade name; product of Shell Chemical Company, Ltd.; epoxy equivalent: 189 g/eq) obtained from 2,2-bis(4-hydroxyphenyl)-propane and another epoxy resin ("DEN-431", trade name; product of Dow Chemical Company; epoxy equivalent: 179 g/eq) derived from a phenol novolak resin were provided. Various properties of those resins were measured as in Examples 6–11. The results are also shown in Table 2.

TABLE 1

|  |  | Ex. 1 | Ex. 2 | Ex. 3 | Ex. 4 | Ex. 5 | Comp. Ex. 1 |
|---|---|---|---|---|---|---|---|
| Epoxy resin | Kind | Syn. | Syn. | Syn. | Syn. | Syn. | EPICOAT |
|  | Epoxy eq. (g/eq.) | 482.5 | 441.5 | 479.5 | 443.5 | 475.5 | 184–194 |
|  | Amount added (g) | 100 | 100 | 100 | 100 | 100 | 100 |
| Curing agent | kind | DADPS | DADPS | DADPS | DADPS | DADPS | DADPS |
|  | Amount added (g) | 14.1 | 15.5 | 14.2 | 15.4 | 14.3 | 35.9 |
| Curing schedule (°C./hr) |  | | | 100/2 + 200/4 | | | |
| Heat distortion temperature (°C.) |  | 298 | 332 | 277 | 298 | 272 | 175 |
| Flexural strength (kgf/mm²) |  | 16.2 | 14.5 | 16.8 | 17.2 | 12.8 | 12.6 |
| Modulus of flexural (kgf/mm²) elasticity |  | 334 | 316 | 343 | 321 | 352 | 300 |
| Tensile strength (kgf/mm²) |  | 11.2 | 9.6 | 12.7 | 10.0 | 13.3 | 6.0 |
| Tensile elongation (%) |  | 5.6 | 4.9 | 5.9 | 5.1 | 6.0 | 3.0 |

TABLE 2

|  |  | Ex. 6 | Ex. 7 | Ex. 8 | Ex. 9 | Ex. 10 | Ex. 11 | Comp. Ex. 2 | Comp. Ex. 3 |
|---|---|---|---|---|---|---|---|---|---|
| Composition (weight ratio) |  | | | | | | | | |
| Epoxy resin | Resin of Syn. Ex. 1 | 100 | | | | 40 | 70 | | |
|  | Resin of Syn. Ex. 2 | | 100 | | | | | | |
|  | Resin of Syn. Ex. 3 | | | 100 | | | | | |
|  | Resin of Syn. Ex. 4 | | | | 100 | | | | |
|  | EPICOAT 828 | | | | | 60 | | 100 | |
|  | DEN-431 | | | | | | 30 | | 100 |
| Curing agent | Phenol novolak resin (BRG. #5853) | | 23 | | | | | | 54 |
|  | Acid anhydride (Epicure YH-306) | | | | | | 52.5 | | |
|  | 4,4'-Methylenedianiline | 10 | | 7 | 10 | 18.5 | | 26.8 | |
| Additive | Curing accelerator (TAP) | | | 1 | | | | | |
| Gel time of blend (m, s/150° C.) |  | 6'45" | 8'15" | 7'30" | 6'35" | 7'10" | 7'30" | 4'30" | 3'50" |
| Properties of cured resin |  | | | | | | | | |
| Heat distortion temperature (°C.) |  | 205 | 198 | 217 | 196 | 173 | 180 | 162 | 126.5 |
| Glass transition temperature (°C.) |  | 251 | 211 | 227 | 235 | 178 | 181 | 162 | 125 |
| Flexural strength (kgf/mm²) |  | 13.1 | 8.9 | 16.2 | 15.8 | 12.9 | 10.7 | 12.2 | 9.5 |
| Modulus of flexural elasticity (kgf/mm²) |  | 338 | 301 | 361 | 350 | 292 | 322 | 277 | 311 |
| Tensile strength (kgf/mm²) |  | 9.3 | 7.8 | 12.3 | 10.0 | 9.0 | 10.1 | 8.8 | 10.2 |
| Tensile elongation (%) |  | 5.7 | 4.7 | 6.2 | 6.1 | 3.9 | 3.3 | 3.2 | 2.1 |
| Initiation temperature of thermal decomposition (°C.) |  | 372 | 402 | 385 | 359 | 351 | 347 | 365 | 341 |
| Adhesion test 20° C. tensile shear (kg/cm²) |  | 213 | 192 | 215 | 215 | 172 | 183 | 169 | 149 |
| adhesion strength 150° C. |  | 152 | 161 | 148 | 145 | 123 | 127 | 45 | 21 |

What is claimed is:

1. An epoxy resin obtained from an imido-ring-containing diphenol represented by the following formula (I):

-continued wherein R represents an aliphatic group having at least two carbon atoms, an alicyclic group, a monocyclic aryl group, a fused polycyclic aromatic group, or a non-fused polycyclic aromatic group formed of aromatic groups coupled together directly or via a linking member and the two hydroxyl groups are each bonded to a meta position or the para position, at least 50% of the hydroxyl groups of molecules of said diphenol having been epoxidized.

2. The epoxy resin of claim 1, wherein R is a residue of a tetracarboxylic dianhydride selected from ethylenetetracarboxylic dianhydride, 1,2,3,4-butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perillenetetracarboxylic dianhydride, 2,3,6,7-anthracenetetracarboxylic dianhydride, 1,2,7,8-anthracenetetracarboxylic dianhydride, 1,2,7,8-phenanethrenetetracarboxylic dianhydride, 1,3-bis(3,4-dicarboxyphenoxy)phenyl dianhydride.

3. The epoxy resin of claim 2, wherein R is a residue of a tetracarboxylic dianhydride selected from 1,2,3,4-butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, bis(3,4-dicarboxyphenyl) ether dianhydride, bis(3,4-dicarboxyphenyl) sulfone dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride.

4. A process for producing an imido-ring-containing epoxy resin, which comprises reacting an imido-ring-containing diphenol represented by the following formula (I):

(I)

-continued wherein R represents an aliphatic group having at least two carbon atoms, an alicyclic group, a monocyclic aryl group, a fused polycyclic aromatic group, or a non-fused polycyclic aromatic group formed of aromatic groups coupled together directly or via a linking member and the two hydroxyl groups are each bonded to a meta position or the para position, at least 50% of the hydroxyl groups of molecules of said diphenol having been epoxidized, with an epihalohydrin.

5. The process of claim 4, wherein the reaction temperature ranges from about 40° C. to about 120° C.

6. The process of claim 4, wherein the epihalohydrin is epichlorohydrin.

7. A process for producing an imido-ring-containing epoxy resin, which comprises reacting an imido-ring-containing diphenol, which is represented by the following formula (I):

(I)

wherein R represents an aliphatic group having at least two carbon atoms, an alicyclic group, a monocyclic aryl group, a fused polycyclic aromatic group, or a non-fused polycyclic aromatic group formed of aromatic groups coupled together directly or via a linking member and the two hydroxyl groups are each bonded to a meta position or the para position, at least 50% of the hydroxyl groups of molecules of said diphenol having been epoxidized, with an epihalohydrin in the presence of a hydrogen halide acceptor.

8. The process of claim 7, wherein the reaction temperature ranges from about 40° C. to about 120° C.

9. The process of claim 7, wherein the epihalohydrin is epichlorohydrin.

10. The process of claim 7, wherein the hydrogen halide acceptor is a metal hydroxide, an alkali metal salt of an organic acid, an organic amine or an alcoholate.

11. The process of claim 7, wherein the hydrogen halide acceptor is an alkali metal hydroxide.

12. An epoxy resin composition comprising the epoxy resin of claim 1, 2 or 3 and a curing agent, wherein the epoxy resin is in a proportion of at least 15 wt. % of the whole composition.

13. The epoxy resin composition of claim 12, wherein the epoxy resin is in a proportion of about 20–100 wt. % of the whole epoxy component.

14. The epoxy resin composition of claim 12, further comprising a curing accelerator.

15. The epoxy resin composition of claim 14, wherein the curing agent is a novolak resin, alicyclic amine, aromatic amine, aromatic amine-formaldehyde condensation product, guanidine derivative or polybasic acid anhydride.

* * * * *